(12) United States Patent  (10) Patent No.: US 8,890,650 B2
Nguyen et al.  (45) Date of Patent: Nov. 18, 2014

(54) FLUID HUMAN-MACHINE INTERFACE

(76) Inventors: Thong T. Nguyen, Milwaukee, WI (US);
Steven J. Scott, Oconomowoc, WI (US)

( * ) Notice: Subject to any disclaimer, the term of this patent is extended or adjusted under 35 U.S.C. 154(b) by 1018 days.

(21) Appl. No.: 12/789,528

(22) Filed: May 28, 2010

(65) Prior Publication Data

US 2010/0301995 A1 Dec. 2, 2010

Related U.S. Application Data

(60) Provisional application No. 61/182,395, filed on May 29, 2009.

(51) Int. Cl.
*H04L 9/32* (2006.01)
*G06F 3/01* (2006.01)

(52) U.S. Cl.
USPC ............. 340/5.2; 340/539.1; 340/539.11; 340/539.13; 340/539.21; 340/539.23; 340/686.1; 340/687; 340/686.6; 340/5.74; 340/5.8; 340/5.81; 340/5.82; 340/5.83; 340/5.84; 340/5.85; 345/156; 345/7; 345/8; 715/863

(58) Field of Classification Search
USPC ............ 340/539.23, 686.6, 539.1, 539.11, 340/539.13, 539.21, 686.1, 687, 5.2, 5.74, 340/5.8, 5.81, 5.82, 5.83, 5.84, 5.85; 345/7, 345/8, 156; 715/863
See application file for complete search history.

(56) References Cited

U.S. PATENT DOCUMENTS

| 5,742,263 | A  | * | 4/1998  | Wang et al. ................. 345/8 |
| 6,167,464 | A  | * | 12/2000 | Kretschmann ............... 710/15 |
| 6,172,657 | B1 | * | 1/2001  | Kamakura et al. ........... 345/8 |
| 6,583,801 | B2 | * | 6/2003  | Eastty et al. ................. 715/863 |
| 8,220,936 | B2 | * | 7/2012  | Yonishi ....................... 353/42 |
| 8,549,418 | B2 | * | 10/2013 | Lamarca et al. ............. 715/764 |
| 2002/0140633 | A1 | * | 10/2002 | Rafii et al. ................. 345/8 |
| 2006/0055672 | A1 | * | 3/2006  | Krocker et al. ............. 345/158 |
| 2007/0013716 | A1 | * | 1/2007  | Kjeldsen et al. ............ 345/594 |
| 2007/0078966 | A1 | * | 4/2007  | Bromley ..................... 709/224 |
| 2008/0167123 | A1 | * | 7/2008  | Luciano et al. ............. 463/31 |
| 2009/0295712 | A1 | * | 12/2009 | Ritzau ......................... 345/156 |

* cited by examiner

*Primary Examiner* — Daniel Wu
*Assistant Examiner* — John Bamert (57) ABSTRACT

A method of operating a communication device to interface with a machine system comprises projecting a human-machine interface (HMI) system for the machine system on a surface, wherein the HMI system comprises a plurality of commands associated with the machine system, detecting an input from a user, wherein the input comprises a fluid motion in air performed by the user corresponding to a selection of a command of the plurality of commands associated with the machine system, and transferring the selected command for delivery to the machine system.

20 Claims, 7 Drawing Sheets

FLUID HUMAN-MACHINE INTERFACE

RELATED APPLICATIONS

This application claims the benefit of U.S. provisional application entitled "FLUID HUMAN-MACHINE INTERFACE" having Ser. No. 61/182,395 filed on May 29, 2009, all of which is entirely incorporated herein by reference.

TECHNICAL FIELD

The invention is related to the field of human-machine interfaces, and in particular, to a system that projects a human-machine interface for a machine on a surface.

TECHNICAL BACKGROUND

Industrial environments include automobile manufacturing factories, food processing plants, and microprocessor fabrication facilities. The typical industrial environment includes various machines, such as drives, pumps, motors, and robots. These machines continually produce data that indicates the current status of the machines, such as the machine's pressure, temperature, or speed.

The typical industrial environment also includes a Human-Machine Interface (HMI). The HMI receives and processes the status data from the machines to generate various graphical displays. The graphical displays indicate the current and historical status of the machines. For example, an HMI graphical display might indicate status metrics of a drive, the pressure of a pump, the speed of a motor, or the output of a robot. The HMI may also control the machines. For example, the HMI might update drive parameters, turn on a pump, speed-up a motor, or stop a robot.

Existing HMI systems often require a user to operate an HMI from a remote location, far away from the actual machine that the HMI is interfacing with and controlling. Even if the user can operate an HMI in close proximity to the machine being monitored or controlled, the HMI is typically a physical device that must be operated by physical touches provided by the user, often requiring the use of a mouse, keyboard, or similar input devices.

TECHNICAL SUMMARY

A method of operating a communication device to interface with a machine system comprises projecting a human-machine interface (HMI) system for the machine system on a surface, wherein the HMI system comprises a plurality of commands associated with the machine system, detecting an input from a user, wherein the input comprises a fluid motion in air performed by the user corresponding to a selection of a command of the plurality of commands associated with the machine system, and transferring the selected command for delivery to the machine system.

In some examples, the method further comprises receiving a user identifier and a machine system identifier, wherein the user identifier identifies the user and the machine system identifier identifies the machine system, and determining a proximity of the user to the machine system, wherein projecting the HMI system for the machine system comprises projecting the HMI system if the proximity of the user to the machine system satisfies a proximity requirement.

In some examples, projecting the HMI system for the machine system comprises projecting the HMI system for the machine system based on the machine system identifier.

In some examples, projecting the HMI system for the machine system comprises selecting the HMI system for the machine system based on the machine system identifier, determining if the user is authorized to view the HMI system based on the user identifier, and if the user is authorized to view the HMI system, projecting the HMI system for the machine system if the proximity of the user to the machine system satisfies the proximity requirement.

In some examples, detecting the input from the user comprises processing the fluid motion performed by the user in relation to the projected HMI system to determine the selected command associated with the machine system.

In some examples, projecting the HMI system for the machine system on the surface comprises projecting the HMI system for the machine system on an exterior surface of the machine system.

In some examples, projecting the HMI system for the machine system on the surface comprises projecting the HMI system for the machine system on a wall.

A communication device configured to interface with a machine system comprises a human-machine interface (HMI) display device, a processing system, and a communication interface. The HMI display device is configured to project an HMI system for the machine system on a surface, wherein the HMI system comprises a plurality of commands associated with the machine system. The processing system is configured to detect an input from a user, wherein the input comprises a fluid motion in air performed by the user corresponding to a selection of a command of the plurality of commands associated with the machine system. The communication interface is configured to transfer the selected command for delivery to the machine system.

A computer readable medium has program instructions stored thereon. When executed by a communication device, the program instructions are configured to direct the communication device to project a human-machine interface (HMI) system for the machine system on a surface, wherein the HMI system comprises a plurality of commands associated with the machine system, detect an input from a user, wherein the input comprises a fluid motion in air performed by the user corresponding to a selection of a command of the plurality of commands associated with the machine system, and transfer the selected command for delivery to the machine system.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
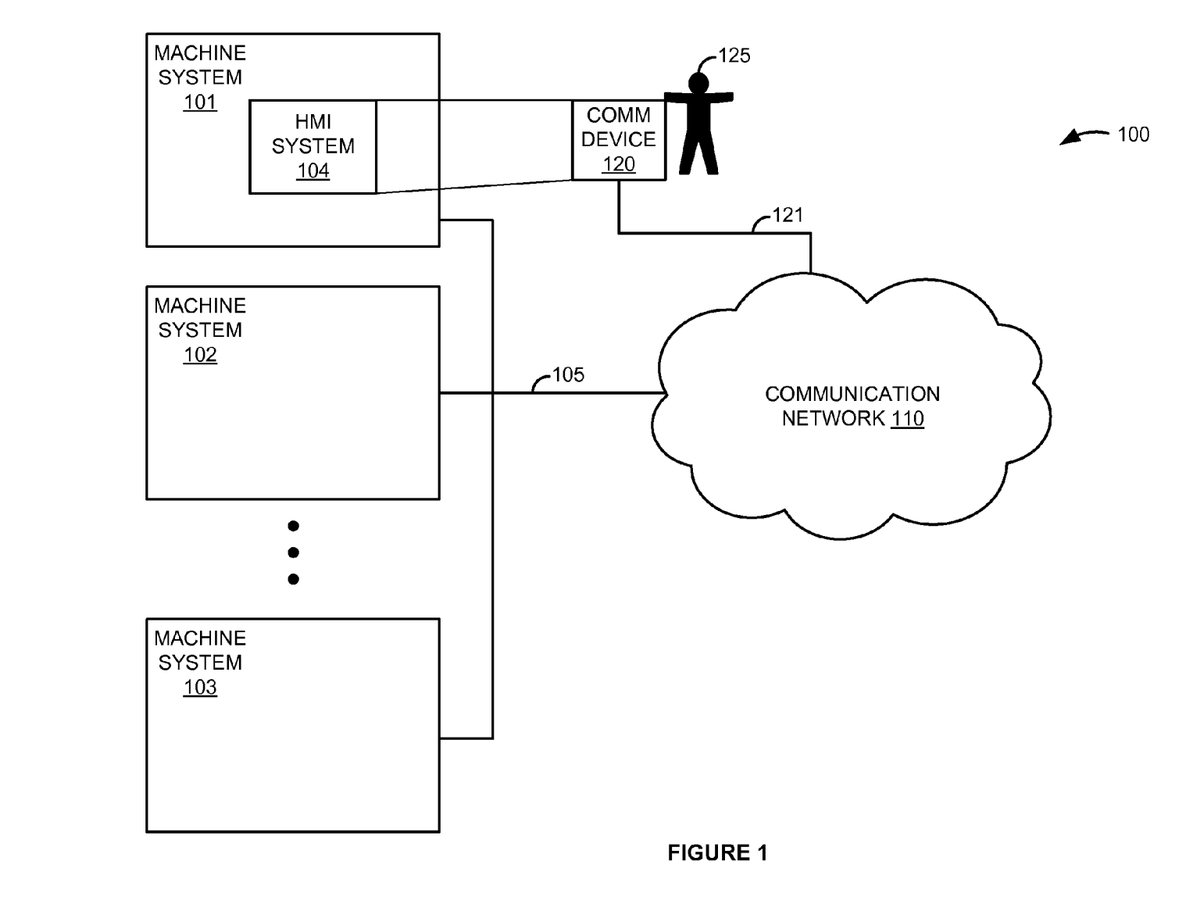
FIG. 1 is a block diagram that illustrates an industrial environment.

FIG. 1 is a block diagram that illustrates industrial environment 100. Industrial environment 100 comprises machine systems 101-103, communication network 110, and communication device 120. Machine systems 101-103 are in communication with communication network 110 over communication link 105. Communication device 120 is in communication with communication network 110 over communication link 121. Communication device 120 projects Human-Machine Interface (HMI) system 104 on a surface. User 125 operates HMI system 104 using fluid motions in air or space as interpreted by communication device 120. Note that the number of machine systems shown in FIG. 1 has been restricted for clarity; there would typically be many more.

Industrial environment 100 comprises an automobile manufacturing factory, food processing plant, microprocessor fabrication facility, or some other type of industrial enterprise. Machine systems 101-103 comprise drives, pumps, motors, robots, or some other mechanical apparatus, including their associated control systems. A control system comprises, for example, a programmable logic controller (PLC). Additionally, machine systems 101-103 comprise other, non-mechanical elements, such as a brew kettle in a brewery, a reserve of coal or other resources, or any other element that may reside in an industrial environment 100.

Machine systems 101-103 continually produce operational data over time. The operational data indicates the current status of machine systems 101-103, such as parameters, pressure, temperature, speed, or some other status metrics. The operational data may comprise dynamic charts or trends, real-time video, or some other graphical content. Machine systems 101-103 are capable of transferring the operational data over communication link 105 to communication network 110 and to communication device 120 via network 110 and communication link 121.

Communication network 110 comprises multiple network elements such as routers, gateways, telecommunication switches, servers, processing systems, or other communication equipment and systems for providing communication and data services. Communication network 110 could comprise wireless communication nodes, telephony switches, Internet routers, network gateways, computer systems, communication links, or some other type of communication equipment—including combinations thereof. Communication network 110 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 110 may be configured to communicate over metallic, wireless, or optical links. Communication network 110 may be configured to use time-division multiplexing (TDM), Internet Protocol (IP), Ethernet, optical networking, wireless protocols, communication signaling, or some other communication format—including combinations thereof.

Communication device 120 comprises hardware and circuitry programmed to function as a telecommunications device. Communication device 120 may comprise a communication interface, user interface, memory device, software, processing circuitry, or some other communication components. For example, communication device 120 could comprise a telephone, wireless transceiver, mobile phone, computer, personal digital assistant (PDA), mobile Internet device, network interface card, or some communication apparatus—including combinations thereof. In some examples, communication device 120 could comprise a wireless communication device comprising Radio Frequency (RF) communication circuitry and an antenna. Communication device 120 could also comprise a camera and a projector. Communication device 120 is capable of displaying HMI system 104 on a surface, typically through the use of a projector. Communication device 120 is also capable of receiving operational data from machine systems 101-103 over communication link 105. Communication device 120 is capable of processing the operational data of machine systems 101-103 to generate various graphical displays indicating the current and historical status of machine systems 101-103, and can project the graphical displays as part of HMI system 104. In addition, communication device 120 is also capable of displaying various control functions for HMI system 104, such as buttons, levers, wheels, knobs, or other control mechanisms which a user 125 can manipulate through fluid motions in the air or space. By detecting the input motions of the user 125 and determining the corresponding control functions, communication device 120 is configured to transfer the control instructions over communication link 121 to communication network 110 and to machine systems 101-103 over communication link 105.

HMI system 104 comprises a Human-Machine Interface for a machine system 101-103 projected by communication device 120 on a surface. For example, communication device 120 could display HMI system 104 on a surface through the use of a projector component of communication device 120. HMI system 104 allows a user 125 to view status metrics related to a machine system 101-103, and also provides a mechanism for the user 125 to control machine systems 101-103 as discussed above. For example, HMI system 104 might allow a user 125 to turn on a pump, speed-up a motor, stop a robot, boil a brew kettle, or perform some other type of machine control. To operate such functions, the user would simply provide a fluid motion in the air or space in relation to the projected image on the surface, and a camera of communication device 120 would monitor these motions and receive the motions as user input data. The user input is then interpreted by communication device 120 and the appropriate control instructions are sent to the appropriate machine system 101-103. In addition, HMI system 104 may display various graphical displays as projected by communication device 120, which could indicate, for example, the pressure of the pump, the speed of the motor, the output of the robot, the temperature of the brew kettle, or some other status metric.

Communication links 105 and 121 use metal, air, space, optical fiber such as glass or plastic, or some other material as the transport media—including combinations thereof. Communication links 105 and 121 could use various communication protocols, such as time-division multiplexing (TDM), Internet Protocol (IP), Ethernet, telephony, optical networking, hybrid fiber coax (HFC), communication signaling, wireless protocols, or some other communication format—including combinations thereof. Communication links 105 and 121 may be direct links or could include intermediate networks, systems, or devices. For example, communication links 105 and 121 could comprise a wireless network, wired network, optical network, local area network, wide area network, or some other communication network—including combinations thereof.

Figure 2:
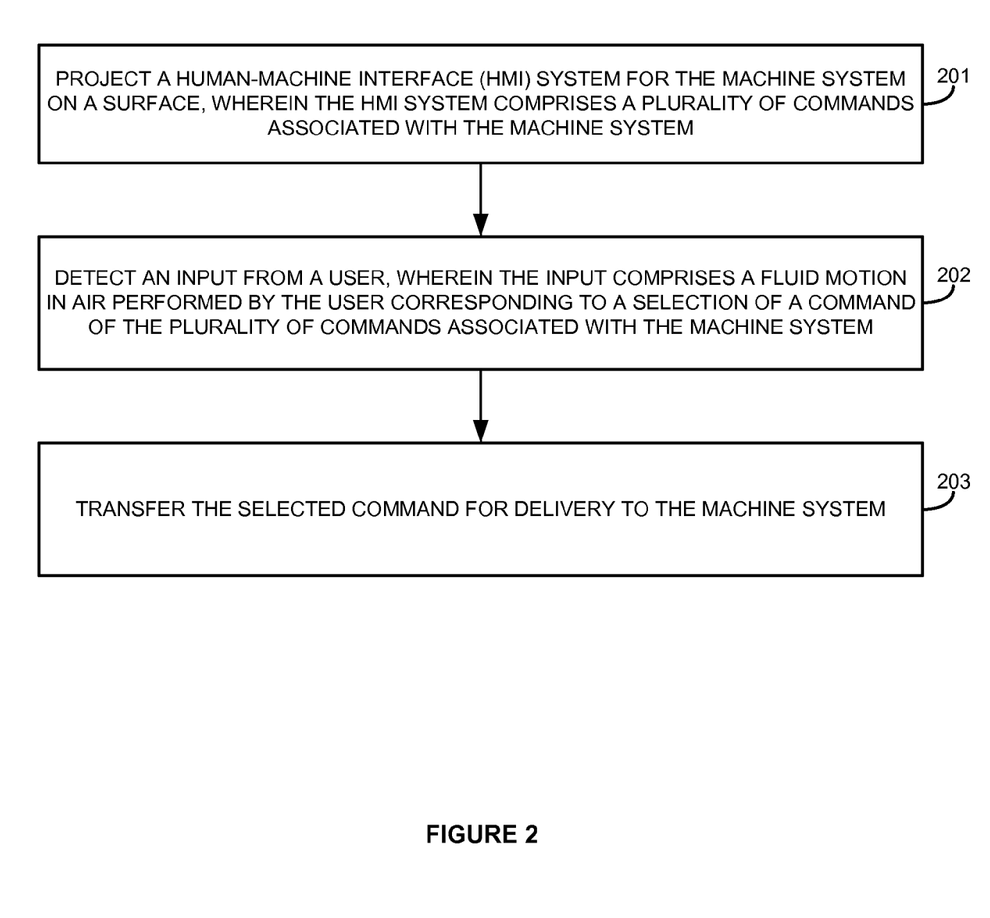
FIG. 2 is a flow diagram that illustrates an operation of a communication device in the industrial environment.

FIG. 2 is a flow diagram that illustrates an operation of communication device 120 in industrial environment 100. The steps of the operation are indicated below parenthetically. In FIG. 2, communication device 120 projects human-machine interface (HMI) system 104 for machine system 101 on a surface, wherein the HMI system comprises a plurality of commands associated with machine system 101 (201). The plurality of commands could comprise instructions to control an operation of machine system 101, to request status metrics from machine system 101, or some other command recognized by machine system 101. Although FIG. 1 shows communication device 120 projecting HMI system 104 on a surface of machine system 101, communication device 120 could also display HMI system 104 on any surface suitable for projection, such as a wall or door, or even the palm of a hand of user 125. In some examples, communication device 120 could project HMI system 104 for a plurality of machine systems 101-103.

Communication device 101 detects an input from a user 125, wherein the input comprises a fluid motion in air performed by the user 125 corresponding to a selection of a command associated with machine system 101 (202). For example, user 125 can manipulate the plurality of commands displayed on HMI system 104 through fluid motions in the air or space. The camera component of communication device 120 is configured to monitor such fluid motions performed by a user 125, and interpreting these motions to determine which control function the user 125 is requesting. In some examples, communication device 120 detects the input from user 125 by detecting the fluid motion performed by the user 125 in relation to the commands being displayed on the HMI system 104. In some examples, the user 125 could provide multiple inputs by utilizing several fingers and/or both hands to provide the fluid motion input. In this case, the user 125 could differentiate the various inputs by associating different colors with different fingers, such as by wearing gloves with different color-coded finger pockets. Communication device 120 could then be configured to detect the different colors to determine the precise points of the input based on the colors.

Once communication device 120 detects an input from a user 125 corresponding to a selection of a command associated with machine system 101, communication device 120 transfers the selected command for delivery to machine system 101 (203). Communication device 120 can be configured to provide the selected command in a format or language recognized by machine system 101, so that machine system 101 is capable of processing the selected command. In other examples, communication device 120 transfers the selected command to a server or system within communication network 110, and the server translates the selected command into a format that machine system 101 can parse. The server would then transfer the translated command to machine system 101.

Advantageously, a user 125 of communication device 120 is able to project HMI system 104 on any surface, enabling the user 125 to quickly and efficiently access HMI system 104 to control and interface with a machine system 101. For example, HMI system 104 displayed by communication device 120 could include various control functions, such as buttons, levers, wheels, knobs, or other control mechanisms which the user 125 can manipulate through fluid motions in the air or space. A camera component of communication device 120 is configured to monitor such fluid motions performed by the user 125, and interprets these motions to determine which control function the user 125 is requesting. Communication device 120 can then execute the control functions determined by the motions of user 125 by sending appropriate control instructions for delivery to machine systems 101-103 over communication network 110. In addition, user 125 can request status metrics from one or more machine systems 101-103 by performing various fluid motions in the air or space in a similar manner to requesting a control function as discussed above.

Figure 3:
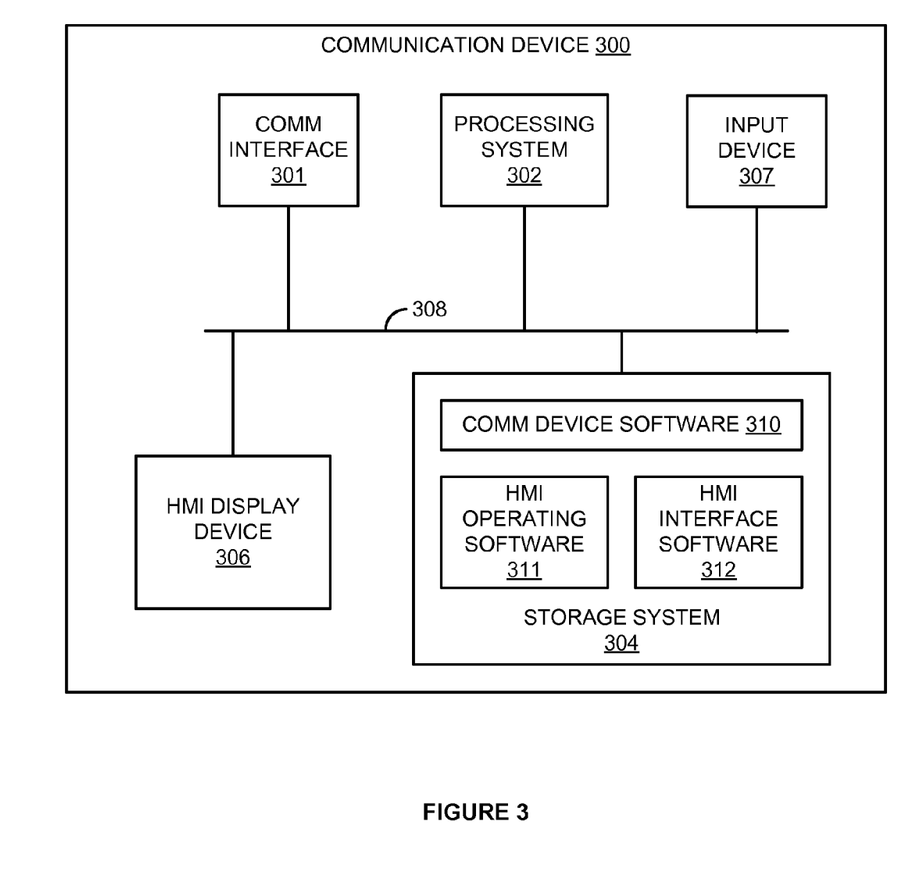
FIG. 3 is a block diagram that illustrates a communication device.

FIG. 3 is a block diagram that illustrates communication device 300. Communication device 300 provides an example of communication device 120, although device 120 may use alternative configurations. Communication device 300 comprises communication interface 301, processing system 302, storage system 304, HMI display device 306, input device 307, and communication system 308. Storage system 304 stores communication device software 310, HMI operating software 311, and HMI interface software 312.

Communication interface 301 comprises components that communicate over communication links, such as network cards, ports, RF transceivers, processing circuitry and software, or some other communication devices. Communication interface 301 may be configured to communicate over metallic, wireless, or optical links. Communication interface 301 may be configured to use time-division multiplexing (TDM), Internet Protocol (IP), Ethernet, optical networking, wireless protocols, communication signaling, or some other communication format—including combinations thereof. Communication interface 301 communicates with machine systems 101-103 over communication network 110. Communication interface 301 is configured to transfer a selected command for delivery to a machine system.

Processing system 302 comprises microprocessors or other logic circuitry that retrieves and executes communication device software 310, HMI operating software 311, and HMI interface software 312. Storage system 304 comprises a disk, integrated circuit, flash drive, optical media, or some other memory device.

HMI display device 306 comprises a projector or some other graphical display projection mechanism. Input device 307 comprises a camera lens or some other photographic components capable of digital imaging. Communication system 308 comprises a bus, local area network, or some other communication apparatus. The above-described components (301, 302, 304, and 306-308) of communication device 300 may be integrated together or distributed among multiple devices.

Communication device software 310 comprises operating software which may include an operating system, utilities, drivers, networking software, and applications capable of performing the functions described herein for a communication device. In particular, communication device software 310 directs processing system 302 to operate HMI display device 306 to project an HMI system for a machine system on a surface, wherein the HMI system comprises a plurality of commands associated with the machine system. In addition, communication device software 310 directs processing system 302 to operate input device 307 to detect an input from a user, wherein the input comprises a fluid motion in air performed by the user corresponding to a selection of one of the commands associated with the machine system. Finally, communication device software 310 directs processing system 302 to direct communication interface 301 to transfer the selected command for delivery to the machine system.

HMI software 311-312 comprises an application program, firmware, or some other form of machine-readable processing instructions. HMI operating software 311 may include an operating system, utilities, drivers, networking, and applications. HMI interface software 311 comprises an application. When executed by processing system 302, HMI software 311-312 directs communication device 300 to operate an HMI system as described herein for HMI system 104.

Figure 4:
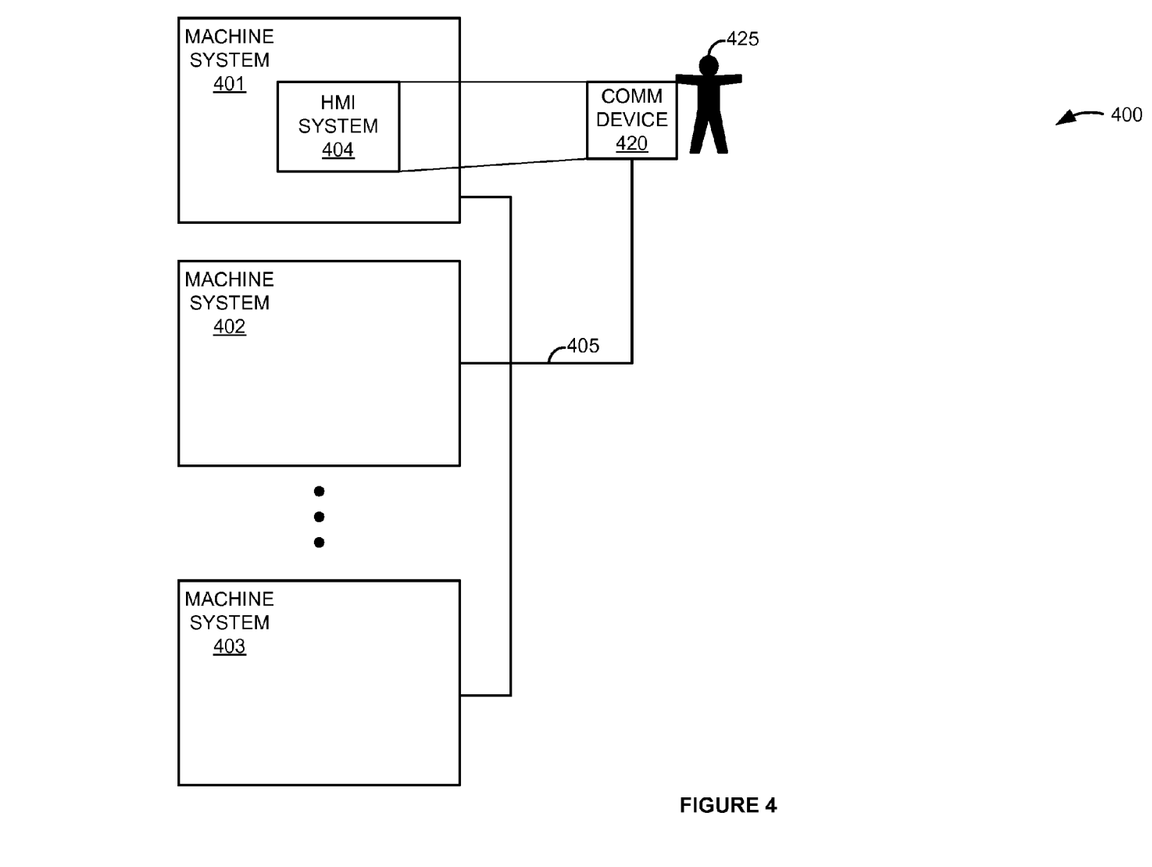
FIG. 4 is a block diagram that illustrates an industrial environment.

FIG. 4 is a block diagram that illustrates industrial environment 400. Industrial environment 400 comprises machine systems 401-403 and communication device 420. Machine systems 401-403 are in communication with communication device 420 over communication system 405. In this example, communication device 420 displays Human-Machine Interface (HMI) system 404 on a surface of machine system 401. For example, machine system 401 may include a cabinet that houses elements of system 401, and HMI system 404 could be displayed on the surface of the cabinet of machine system 401. User 425 operates HMI system 404 using fluid motions in air or space as interpreted by communication device 420. Note that the number of machine systems shown in FIG. 4 has been restricted for clarity; there would typically be many more.

Industrial environment 400 comprises an automobile manufacturing factory, food processing plant, microprocessor fabrication facility, or some other type of industrial enterprise. Machine systems 401-403 comprise drives, pumps, motors, robots, or some other mechanical apparatus, including their associated control systems. A control system comprises, for example, a programmable logic controller (PLC). Additionally, machine systems 401-403 comprise other, non-mechanical elements, such as a brew kettle in a brewery, a reserve of coal or other resources, or any other element that may reside in an industrial environment 400.

Machine systems 401-403 continually produce operational data over time. The operational data indicates the current status of machine systems 401-403, such as parameters, pressure, temperature, speed, or some other status metrics. The operational data may comprise dynamic charts or trends, real-time video, or some other graphical content. Machine systems 401-403 are capable of transferring the operational data to communication device 420 over communication system 405. In addition, communication device 420 transfers control instructions to machine systems 401-403 over communication system 405. The control instructions control an operation of one or more machine systems 401-403.

Communication system 405 could comprise a wireless network, wired network, optical network, local area network, wide area network, or some other communication network —including combinations thereof. Communication system 405 could use various communication protocols, such as time-division multiplexing (TDM), Internet Protocol (IP), Ethernet, telephony, optical networking, hybrid fiber coax (HFC), communication signaling, wireless protocols, or some other communication format—including combinations thereof. Communication system 405 may be a direct link or could include intermediate networks, systems, or devices. In some examples, communication system 405 comprises a personal area network (PAN) such as BLUETOOTH, or a wireless local area network (LAN), such as WI-FI, and communication device 420 communicates locally with machine systems 401-403 via communication system 405 using BLUETOOTH, WI-FI, or similar wireless technologies.

Communication device 420 comprises hardware and circuitry programmed to function as a telecommunications device. Communication device 420 may comprise a communication interface, user interface, memory device, software, processing circuitry, or some other communication components. For example, communication device 420 could comprise a telephone, wireless transceiver, mobile phone, computer, personal digital assistant (PDA), mobile Internet device, network interface card, or some communication apparatus—including combinations thereof. In some examples, communication device 420 could comprise a wireless communication device comprising Radio Frequency (RF) communication circuitry and an antenna. Communication device 420 could also comprise a camera and a projector. Communication device 420 is capable of displaying HMI system 404 on a surface, typically through the use of a projector. Communication device 420 is also capable of receiving operational data from machine systems 401-403 via communication system 405. Communication device 420 is capable of processing the operational data of machine systems 401-403 to generate various graphical displays indicating the current and historical status of machine systems 401-403, and can project the graphical displays as part of HMI system 404. In addition, communication device 420 is also capable of displaying various control functions for HMI system 404, such as buttons, levers, wheels, knobs, or other control mechanisms which a user 425 can manipulate through fluid motions in the air or space. By detecting the input motions of the user 425 and determining the corresponding control functions, communication device 420 is configured to transfer the control instructions over communication system 405 to machine systems 401-403.

HMI system 404 comprises a Human-Machine Interface for a machine system 401-403 projected by communication device 420 on a surface. In this example, communication device 420 projects HMI system 404 on a surface of machine system 401 through the use of a projector component of communication device 420. HMI system 404 allows a user 425 to view status metrics related to a machine system 401-403, and also provides a mechanism for the user 425 to control machine systems 401-403 as discussed above. For example, HMI system 404 might allow a user 425 to turn on a pump, speed-up a motor, stop a robot, boil a brew kettle, or perform some other type of machine control. To operate such functions, the user would simply provide a fluid motion in the air or space in relation to the projected image on the surface, and a camera of communication device 420 would monitor these motions and receive the motions as user input data. The user input is then interpreted by communication device 420 and the appropriate control instructions are sent to the corresponding machine system 401-403. In addition, HMI system 404 may display various graphical displays as projected by communication device 420, which could indicate, for example, the pressure of the pump, the speed of the motor, the output of the robot, the temperature of the brew kettle, or some other status metric.

Figure 5:
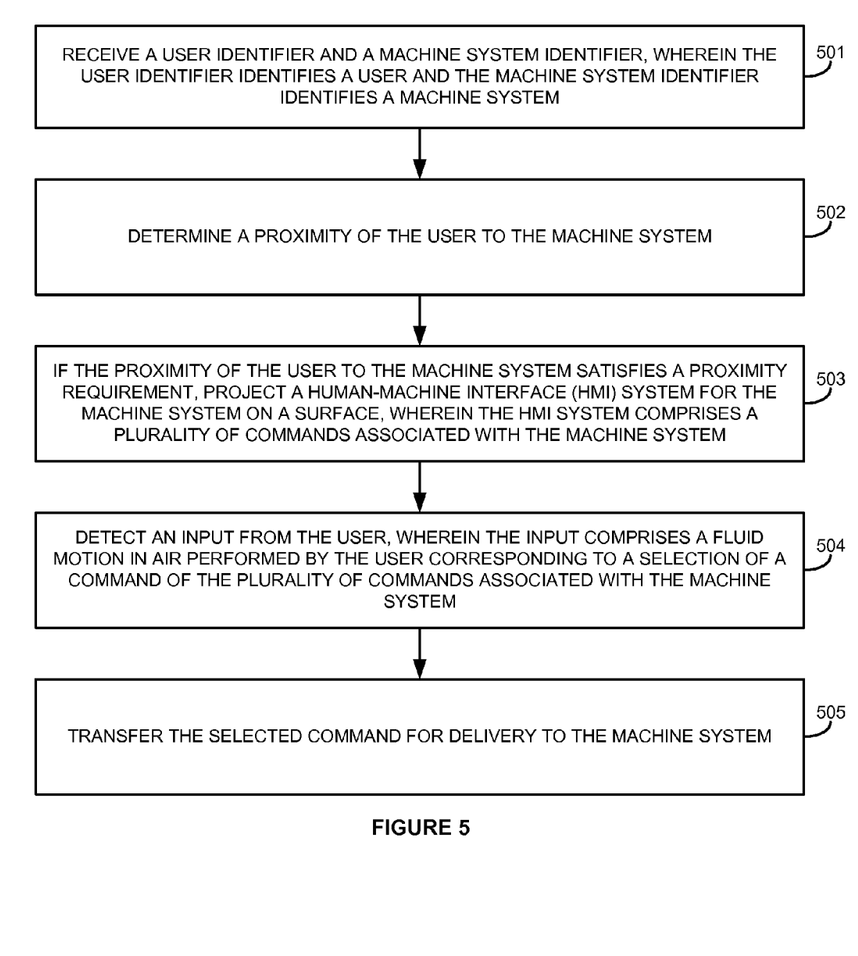
FIG. 5 is a flow diagram that illustrates an operation of a communication device in the industrial environment.

FIG. 5 is a flow diagram that illustrates an operation of communication device 420 in industrial environment 400. The steps of the operation are indicated below parenthetically. In FIG. 5, communication device 420 receives a user identifier and a machine system identifier, wherein the user identifier identifies a user 425 and the machine system identifier identifies a machine system 401 (501). Communication device 420 could receive the user identifier and the machine system identifier in a variety of ways.

To obtain the user identifier of the user 425, communication device 420 could accept an input from the user 425 through various input techniques. In one example, communication device 420 could comprise a microphone, and the user 425 could instruct communication device 420 to accept a spoken user identifier by speaking a voice command along with his or her name, identification number, or other unique identifier, such as by speaking the words "user ID John Smith," for example. Communication device 420 could employ voice identification techniques to verify the voice print of the user 425 to authorize the user 425 to view and operate the HMI system 404.

In another example, a camera component of communication device 420 could photograph various physical attributes of user 425 to determine the user's identity. For example, this identity determination could be achieved if user 425 stands in front of a minor and uses his or her fingers to gesture in a circular motion around his or her face, and communication device 420 could be programmed to recognize the circular motion provided by the user 425 as a request to verify the facial identity of the user 425. In another example, user 425 could speak a voice command, such as "authenticate user by facial scan," which would notify communication device 420 that a facial identification procedure is requested by user 425. In any event, the camera could photograph the facial features of user 425 and compare this photograph to a database of photographs of authorized persons using facial recognition techniques known to one skilled in the art.

In yet another example, user 425 could hold the camera component of communication device 420 in front of his or her eyeball, allowing the camera to perform a retinal scan of user 425. Communication device 420 could also include a laser or other suitable retinal scanner for this purpose. In one example, communication device 420 could be instructed to perform the retinal scan by a voice command spoken by user 425, or some other method could be used to instruct communication device 420 to perform the operation. For example, communication device 420 could be programmed to recognize an eyeball image when the user's eyeball is in close view of the camera, and upon recognition of the input into the camera as that of a close-up view of an eyeball, perform a retinal scan authorization of the eyeball. Communication device 420 could then compare the retinal scan of user 425 to a plurality of authorized retinal scans stored in a database in order to authorize user 425 to view and operate HMI system 404.

In yet another example, the user 425 could simply hold a finger front of the camera component of communication device 420, allowing communication device 420 to photograph the fingerprint of user 425 and compare this fingerprint to a plurality of known fingerprints stored in a database in order to authorize user 425 to view and operate HMI system 404. Alternatively, communication device 420 could comprise a laser or other suitable fingerprint scanning device which the user 425 could use to scan his or her fingerprint in order to verify authorization to view and use HMI system 404 in the same manner as described above. Communication device 420 could be instructed to perform the fingerprint scan by voice command, by recognition of a close-up image of a finger in view of the camera, by receiving a fingerprint data input by the user 425 using a fingerprint scanning device of communication device 420, or some other instruction method.

In addition to the above, traditional input methods could be utilized to provide a user identifier to communication device 420. For example, a text-based username and password or other authorization code could be input by user 425 into communication device 420 through the use of a keyboard, key pad, touch screen, or other input device.

To obtain the machine system identifier of a particular machine system 401-403, communication device 420 could accept an input of the machine identifier through a variety of similar input techniques. In one example, communication device 420 could comprise a microphone, and the user 425 could instruct communication device 420 to accept a spoken machine system identifier by speaking a voice command along with an identifier of a machine system 401-403, such as by speaking the words "machine ID 401" to identify machine system 401, for example. In addition or alternatively to verifying the user identifier as discussed above, communication device 420 could employ voice identification techniques to identify the voice print of the user 425 speaking the machine system identifier, and determine the speaker's user identifier merely from the voice print of the spoken words "machine ID 401." In this manner, communication device 420 could determine that user 425 is authorized to view and operate an HMI system 404 for the requested machine system 401 merely by receiving the spoken words "machine ID 401" and recognizing the voice print of user 425 as an authorized user identifier.

In some examples, each machine system 401-403 could comprise an RF tag, RF Identification (RFID), or some other device that transmits an RF signal to communication device 420 to indicate the machine identifier. The RFID tag may be passive, semi-passive, or active. In this case, communication device 420 could comprise a wireless communication interface capable of receiving an RFID tag from a particular machine system 401-403. Although not required, communication device 420 could optionally transmit an RF excitation signal to drive transmission of an RFID tag from a machine system 401-403. Additionally, a machine system 401-403 may be configured to transmit an RFID signal only within a given range. For example, communication device 420 would need to be proximate (in range) to machine system 401 in order to receive an RFID tag from machine system 401 that identifies machine system 401. In some examples, this could be used to satisfy a proximity requirement, which is discussed in greater detail below.

In another example, the camera component of communication device 420 could photograph various attributes of a machine system 401-403 to determine a machine system identifier of a machine system 401-403. For example, a machine system identifier may be physically scribed on a surface of a machine system 401-403, and the camera component of communication device 420 could photograph this identifier off of the surface of the machine system. This may be achieved, for example, by the user 425 using his or her fingers to gesture around an identification number visible on a surface of a machine system 401-403 in the air or space, and by analyzing the digital image received by the camera, communication device 420 could determine from the gesture or from the number within the gesture that a machine identification has been requested. In another example, communication device 420 could be configured to simply identify a machine system 401-403 based on shape recognition. For example, using the camera component, communication device 420 could identify machine system 403 as a drive based on the shape of machine system 403 matching the shape of a drive. In this manner, communication device 420 could receive the machine system identifier of a machine system 401-403.

Once communication device 420 receives the user identifier of a user 425 and the machine system identifier of a machine system 401, communication device determines a proximity of the user 425 to the machine system 401 (502). Communication device 420 determines the proximity because device 420 will typically only display the appropriate HMI system 404 on the identified machine system 401 based on a proximity of the user 425 to the particular machine system 401 identified by the machine system identifier. In one example, communication device 420 determines the proximity of the user 425 to the machine system 101 identified by the machine system identifier based on the camera's ability to view the identified machine system 101 or to view a machine system identifier on a surface of the machine system 101. Additionally or alternatively, the proximity of the user 425 to the particular machine system 401-403 identified may be determined by location determination technology installed within communication device 420, such as Global Positioning System (GPS) components, for example. In other examples, communication device 420 determines the proximity of the user 425 to the machine system 401 based on personal area network (such as BLUETOOTH) or other RF connectivity between communication device 420 and machine system 401.

Referring again to FIG. 5, if the proximity of the user 425 to the machine system 401 satisfies a proximity requirement, communication device 420 projects HMI system 404 for machine system 401 on a surface, wherein the HMI system comprises a plurality of commands associated with machine system 101 (503). Typically, communication device 420 projects the appropriate HMI system 404 for machine system 401 as indicated by the machine system identifier that identifies machine system 401. The proximity requirement could be determined by threshold values. For example, the proximity requirement could be satisfied when the user 425 is within ten feet of machine system 401. The plurality of commands could comprise instructions to control an operation of machine system 401, to request status metrics from machine system 401, or some other command recognized by machine system 401. In some examples, communication device 420 could project HMI system 404 for a plurality of machine systems 401-403. Additionally, as discussed above, the proximity requirement may be ensured by configuring a machine system 401-403 to transmit an RFID signal only within a given range.

The HMI system 404 displayed by communication device 420 could further comprise any application associated with or utilized by a particular machine system 401-403. For example, HMI system 404 could include a diagnostic tool for troubleshooting error states related to a machine system 401-403, such as a debugger program for debugging the operating code associated with a machine system 401-403. Further, HMI system 404 could comprise a configuration application for a machine system 401-403, to allow the user of communication device 420 to modify configuration settings of machine systems 401-403. In other examples, if machine system 403 comprises a drive, HMI system 404 displayed by communication device 420 could comprise a drive explorer application. Additionally, communication device 420 could project ladder logic for a PLC as part of HMI system 404.

Referring again to FIG. 5, communication device 420 detects an input from a user 425, wherein the input comprises a fluid motion in air performed by the user 425 corresponding to a selection of a command associated with machine system 401 (504). For example, user 425 can manipulate the plurality of commands displayed on HMI system 404 through fluid motions in the air or space. The camera component of communication device 420 is configured to monitor such fluid motions performed by a user 425, and interpreting these motions to determine which control function the user 425 is requesting. In some examples, communication device 420 detects the input from user 425 by detecting the fluid motion performed by the user 425 in relation to the commands being displayed on the HMI system 404. In some examples, the user 425 could provide multiple inputs by utilizing several fingers and/or both hands to provide the fluid motion input. In this case, the user 425 could differentiate the various inputs by associating different colors with different fingers, such as by wearing gloves with different color-coded finger pockets. Communication device 420 could then be configured to detect the different colors to determine the precise points of the input based on the colors.

Once communication device 420 detects an input from a user 425 corresponding to a selection of a command associated with machine system 401, communication device 420 transfers the selected command for delivery to machine system 401 (505). Communication device 420 can be configured to provide the selected command in a format or language recognized by machine system 401, so that machine system 401 is capable of processing the selected command. In other examples, communication device 420 transfers the selected command to a server or system within communication network 410, and the server translates the selected command into a format that machine system 401 can parse. The server would then transfer the translated command to machine system 401.

Typically, communication device 420 displays an HMI system 404 on a surface of a machine system 401-403 that is specific to the machine system 401-403 that the HMI system 404 can monitor and control. For example, in industrial environment 400 of FIG. 4, the HMI system 404 that is displayed on a surface of machine system 401 would typically monitor and control only machine system 401 based on the machine system identifier that identifies system 401. This would be achieved by user 425 providing his or her user identifier and a machine system identifier of machine system 401 as discussed above, and by user 425 standing within close proximity to machine system 401 to satisfy the proximity requirement. In other words, communication device 420 typically projects the HMI system 404 for machine system 401 based on the user identifier, the machine system identifier of the machine system 401, and a proximity of the user 425 to the machine system 401.

Although the exemplary operation described above requires satisfaction of the proximity requirement before communication device 420 projects HMI system 404 for machine system 401, exception conditions would allow an authorized user 425 to override the proximity requirement, which would be useful in the event of an emergency, for example. Under the exception condition, an authorized user 425 could view an HMI system 404 on a surface of a first machine system that controls and monitors a different, second machine system, such as machine system 402 or 403, even if that user is far away from those machine systems 402 or 403. For example, user 425 could speak an emergency override code to bypass the proximity requirement so that communication device 420 would display an HMI system 404 that monitors and controls machine system 402 or 403 on a surface of machine system 401, for example. In addition, communication device 420 could also display an HMI system 404 on any surface, such as a wall or door, or even the palm of a hand of user 425. An HMI system displayed on any surface could be configured to interface with a plurality of machine systems 401-403.

Advantageously, a user 425 of communication device 420 is able to project HMI system 404 on any surface, enabling the user 425 to quickly and efficiently access HMI system 404 to control and interface with a machine system 401. By projecting HMI system 404, a user 425 of communication device 420 can manipulate various control functions of HMI 404 through fluid motions in air or space. For example, HMI system 404 could display buttons, levers, wheels, knobs, or other control mechanisms, and a camera component of communication device 420 can monitor the motions performed by the user 425 in relation to these control mechanisms, and interpret these motions to determine which control function the user 425 is requesting. Communication device 420 can then execute the control functions determined by the motions of user 425 by sending appropriate commands for delivery to machine systems 401-403 over communication system 405. In addition, user 425 can request status metrics from one or more machine systems 401-403 by performing various fluid motions in the air or space in a similar manner to requesting a control function as discussed above.

Figure 6:
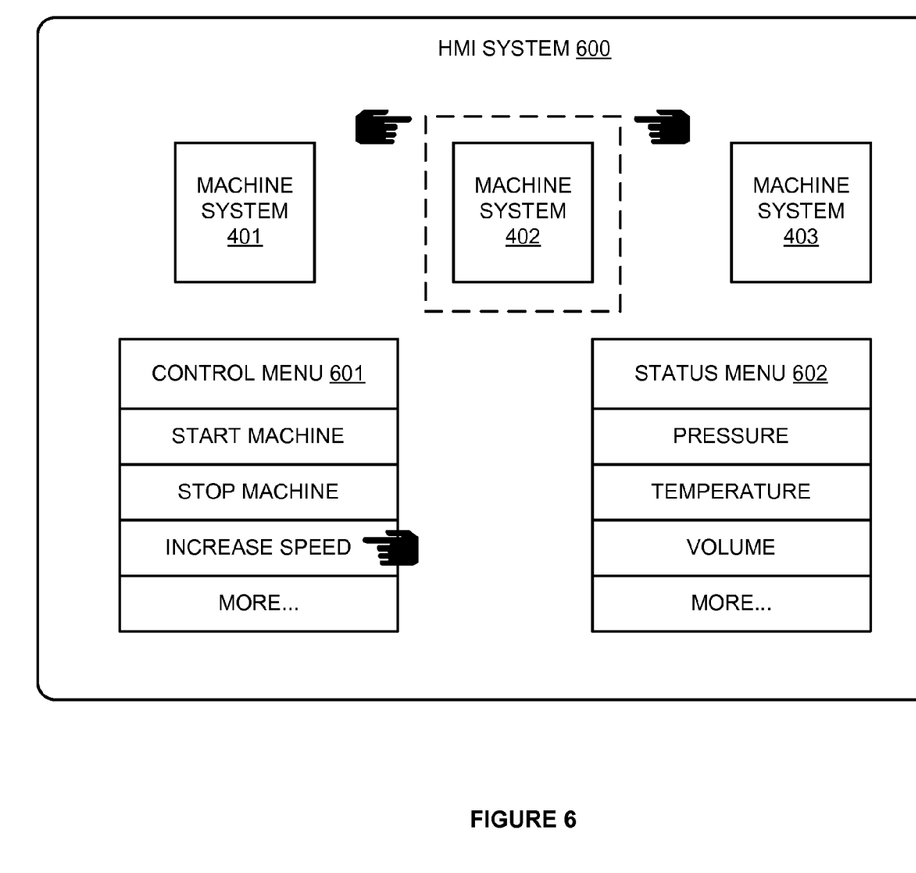
FIG. 6 is a block diagram that illustrates an exemplary display of a human-machine interface (HMI) system projected by a communication device.

FIG. 6 is a block diagram that illustrates an exemplary display of a human-machine interface (HMI) system 600 projected by a communication device. As shown in FIG. 6, HMI system 600 displays a plurality of machine systems 401-403, a control menu 601, and a status menu 602. Control menu 601 comprises a plurality of commands to control machine systems 401-403. Status menu 602 comprises a plurality of commands to request status metrics from machine systems 401-403. Note that menus 601 and 602 may display more or fewer commands than those depicted in FIG. 6. Also note that HMI system 600 may display more or fewer machine systems than the three machine systems 401-403 depicted in FIG. 6.

Machine systems 401-403 as displayed on HMI system 600 are graphical representations of machine systems 401-403 of FIG. 4. Machine systems 401-403 could represent machine systems comprising pumps, motors, robots, vats, resources, or any other element residing in industrial environment 400, including their associated control systems.

Control menu 601 could comprise commands to control any operation associated with machine systems 401-403. In this example, commands to start or stop a machine system 401-403, or to increase a speed of a machine system 401-403 are provided on control menu 601. Status menu 602 could comprise commands to request any type of information associated with a machine system 401-403. Examples of possible information types include maintenance, performance, or historical information, operating status of a machine or process, geographic location of a machine, or a list of other machines connected to a machine. In this example, status menu 602 provides a user 425 with options to request pressure, volume, or temperature metrics from machine systems 401-403.

In FIG. 6, a user 425 has selected machine system 402, as indicated by the dashed line surrounding machine system 402. For example, the user 425 could indicate machine system 402 by gesturing around the image of machine system 402 projected by communication device 420 in HMI system 600. In addition, the user 425 has provided an input of a selection of a command from control menu 601. Specifically, the user 425 has selected to increase the speed of machine system 402. The user 425 could select the command to increase the speed of machine system 402 by providing a fluid motion in relation to the "increase speed" command of control menu 602 on the projected HMI system 600. Communication device 420 is configured to detect the fluid motions performed by the user 425 to determine the selected command. Communication device 420 then transfers a control instruction to machine system 402 that directs machine system 402 to increase its speed of operation.

In some examples, user 425 could provide a machine system identifier by gesturing around a particular machine system, as shown by the dashed line around machine system 402 in FIG. 6. In this case, communication device 420 could display an HMI system specific for machine system 402 as indicated by the user's selection of machine system 402 on HMI system 600. Communication device 420 could then process the operational data of machine system 402 to generate various graphical displays indicating the current and historical status of machine system 402, and can project the graphical displays as part of the HMI system for machine system 402 through the use of a projector. Communication device 420 is also capable of displaying various control functions associated with machine system 402 on the HMI system, such as buttons, levers, wheels, knobs, or other control mechanisms which a user 425 can manipulate through fluid motions in the air or space. The camera component of communication device 420 is capable of monitoring such fluid motions performed by the user 425, and can interpret these motions to determine which control function the user 425 is requesting. Communication device 420 can then execute the control functions determined by the motions of user 425 by sending appropriate control instructions over communication system 405 to machine system 402.

Figure 7:
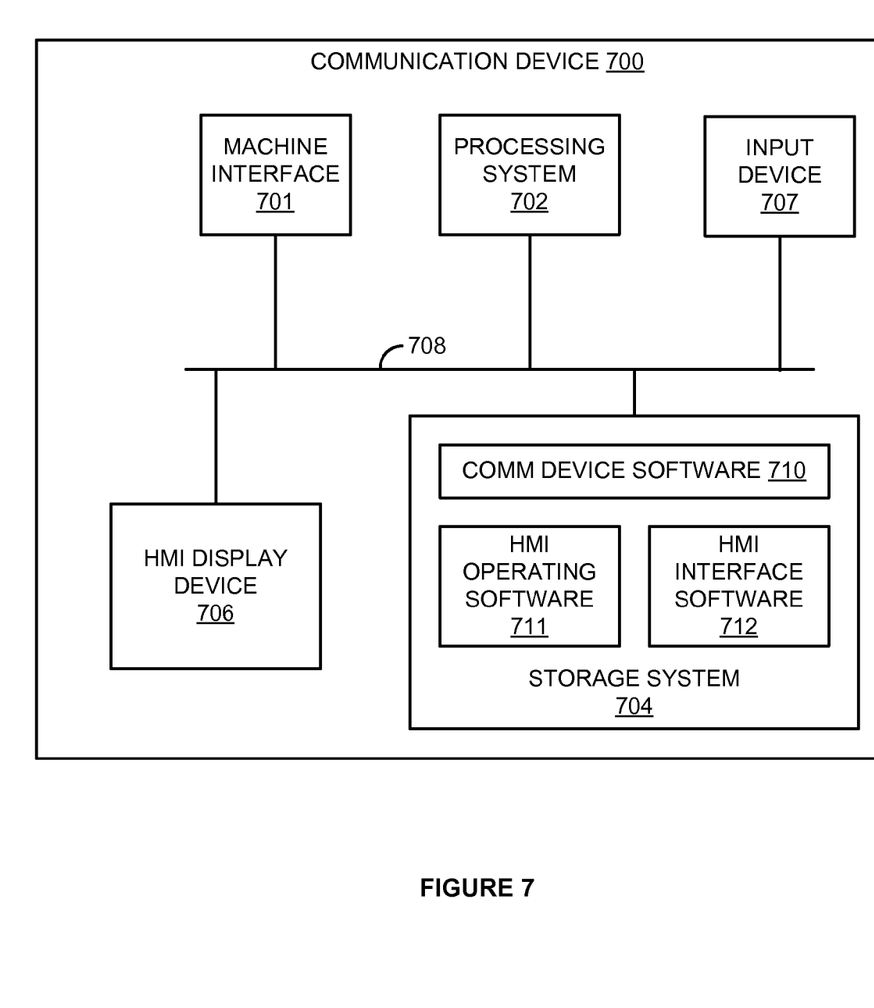
FIG. 7 is a block diagram that illustrates a communication device.

FIG. 7 is a block diagram that illustrates communication device 700. Communication device 700 provides an example of communication device 420, although device 420 may use alternative configurations. Communication device 700 comprises machine interface 701, processing system 702, storage system 704, HMI display device 706, input device 707, and communication system 708. Storage system 704 stores communication device software 710, HMI operating software 711, and HMI interface software 712.

Machine interface 701 comprises components that communicate over communication links, such as network cards, ports, RF transceivers, processing circuitry and software, or some other communication devices. Machine interface 701 may be configured to communicate over metallic, wireless, or optical links. Machine interface 701 may be configured to use time-division multiplexing (TDM), Internet Protocol (IP), Ethernet, optical networking, wireless protocols, communication signaling, or some other communication format—including combinations thereof. Machine interface 701 communicates with machine systems 401-103 over communication system 405. Machine interface 701 is configured to transfer a selected command for delivery to a machine system.

Processing system 702 comprises microprocessors or other logic circuitry that retrieves and executes communication device software 710, HMI operating software 711, and HMI interface software 712. Storage system 704 comprises a disk, integrated circuit, flash drive, optical media, or some other memory device.

HMI display device 706 comprises a projector or some other graphical display projection mechanism. Input device 707 comprises a camera lens or some other photographic components capable of digital imaging. Communication system 708 comprises a bus, local area network, or some other communication apparatus. The above-described components (701, 702, 704, and 706-708) of communication device 700 may be integrated together or distributed among multiple devices.

Communication device software 710 comprises operating software which may include an operating system, utilities, drivers, networking software, and applications capable of performing the functions described herein for a communication device. In particular, communication device software 710 directs processing system 702 to operate input device 707 to receive a user identifier and a machine system identifier, wherein the user identifier identifies the user and the machine system identifier identifies the machine system. Further, communication device software 710 directs processing system 702 to determine a proximity of the user to the machine system, and if the proximity of the user to the machine system satisfies a proximity requirement, communication device software 710 directs processing system 702 to operate HMI display device 706 to project an HMI system for a machine system on a surface, wherein the HMI system comprises a plurality of commands associated with the machine system. In addition, communication device software 710 directs processing system 702 to operate input device 707 to detect an input from a user, wherein the input comprises a fluid motion in air performed by the user corresponding to a selection of one of the commands associated with the machine system. Finally, communication device software 710 directs processing system 702 to direct machine interface 701 to transfer the selected command for delivery to the machine system.

HMI software 711-712 comprises an application program, firmware, or some other form of machine-readable processing instructions. HMI operating software 711 may include an operating system, utilities, drivers, networking, and applications. HMI interface software 711 comprises an application. When executed by processing system 702, HMI software 711-712 directs communication device 700 to operate an HMI system as described herein for HMI system 404.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication device to interface with a machine system in an industrial automation environment, the method comprising:
   receiving a user identifier and a machine system identifier, wherein the user identifier identifies a user and the machine identifier identifies the machine system;
   determining if the user is within a proximate distance to the machine system based on Radio Frequency (RF) connectivity between the communication device and the machine system;
   in response to determining that the user is within the proximate distance to the machine system, projecting a human-machine interface (HMI) system for the machine system on a surface, wherein the HMI system comprises a plurality of commands associated with the machine system;
   detecting an input from the user, wherein the input comprises a fluid motion in air performed by the user corresponding to a selection of a command of the plurality of commands associated with the machine system; and
   transferring the selected command for delivery to the machine system.

2. The method of claim 1 wherein the machine system comprises a drive and a control system associated with the drive in the industrial automation environment.

3. The method of claim 1 wherein projecting the HMI system for the machine system comprises projecting the HMI system for the machine system based on the machine system identifier.

4. The method of claim 1 wherein projecting the HMI system for the machine system comprises selecting the HMI system for the machine system based on the machine system identifier and determining if the user is authorized to view the HMI system based on the user identifier.

5. The method of claim 1 wherein detecting the input from the user comprises processing the fluid motion performed by the user in relation to the projected HMI system to determine the selected command associated with the machine system.

6. The method of claim 1 wherein projecting the HMI system for the machine system on the surface comprises projecting the HMI system for the machine system on an exterior surface of the machine system.

7. The method of claim 1 wherein projecting the HMI system for the machine system on the surface comprises projecting the HMI system for the machine system on a wall.

8. A communication device configured to interface with a machine system in an industrial automation environment, the communication device comprising:
   an input device configured to receive a user identifier and a machine system identifier, wherein the user identifier identifies a user and the machine system identifier identifies the machine system;
   a processing system configured to determine if the user is within a proximate distance to the machine system based on Radio Frequency (RF) connectivity between the communication device and the machine system;
   a human-machine interface (HMI) display device configured to, in response to determining that the user is within the proximate distance to the machine system, project an HMI system for the machine system on a surface, wherein the HMI system comprises a plurality of commands associated with the machine system;
   the processing system configured to detect an input from the user, wherein the input comprises a fluid motion in air performed by the user corresponding to a selection of a command of the plurality of commands associated with the machine system; and
   a communication interface configured to transfer the selected command for delivery to the machine system.

9. The communication device of claim 8 wherein the machine system comprises a drive and a control system associated with the drive in the industrial automation environment.

10. The communication device of claim 8 wherein the HMI display device configured to project the HMI system for the machine system comprises the HMI display device configured to project the HMI system for the machine system based on the machine system identifier.

11. The communication device of claim 8 wherein the HMI display device configured to project the HMI system for the machine system comprises the processing system configured to select the HMI system for the machine system based on the machine system identifier and determine if the user is authorized to view the HMI system based on the user identifier.

12. The communication device of claim 8 wherein the processing system configured to detect the input from the user comprises the processing system configured to process the fluid motion performed by the user in relation to the projected HMI system to determine the selected command associated with the machine system.

13. The communication device of claim 8 wherein the HMI display device configured to project the HMI system for the machine system on the surface comprises the HMI display device configured to project the HMI system for the machine system on an exterior surface of the machine system.

14. The communication device of claim 8 wherein the HMI display device configured to project the HMI system for the machine system on the surface comprises the HMI display device configured to project the HMI system for the machine system on a wall.

15. A non-transitory computer readable medium having program instructions stored thereon that, when executed by a communication device, are configured to direct the communication device to:
- receive a user identifier and a machine system identifier, wherein the user identifier identifies a user and the machine identifier identifies a machine system;
- determine if the user is within a proximate distance to the machine system based on Radio Frequency (RF) connectivity between the communication device and the machine system;
- in response to determining that the user is within the proximate distance to the machine system, project a human-machine interface (HMI) system for the machine system on a surface, wherein the HMI system comprises a plurality of commands associated with the machine system;
- detect an input from the user, wherein the input comprises a fluid motion in air performed by the user corresponding to a selection of a command of the plurality of commands associated with the machine system; and
- transfer the selected command for delivery to the machine system.

16. The non-transitory computer readable medium of claim 15 wherein the machine system comprises a drive and a control system associated with the drive in an industrial automation environment.

17. The non-transitory computer readable medium of claim 15 wherein the program instructions configured to direct the communication device to project the HMI system for the machine system on the surface comprises the program instructions configured to project the HMI system for the machine system based on the machine system identifier.

18. The non-transitory computer readable medium of claim 15 wherein the program instructions configured to direct the communication device to project the HMI system for the machine system on the surface comprises the program instructions configured to direct the communication device to select the HMI system for the machine system based on the machine system identifier and determine if the user is authorized to view the HMI system based on the user identifier.

19. The non-transitory computer readable medium of claim 15 wherein the program instructions configured to direct the communication device to detect the input from the user comprises the program instructions configured to direct the communication device to process the fluid motion performed by the user in relation to the projected HMI system to determine the selected command associated with the machine system.

20. The non-transitory computer readable medium of claim 15 wherein the program instructions configured to direct the communication device to project the HMI system for the machine system on the surface comprises the program instructions configured to direct the communication device to project the HMI system for the machine system on an exterior surface of the machine system.

* * * * *